United States Patent
Song et al.

(10) Patent No.: US 9,857,665 B2
(45) Date of Patent: Jan. 2, 2018

(54) PHOTOGRAPHING APPARATUS, METHOD OF OPERATING THE PHOTOGRAPHING APPARATUS, AND WIRELESS COMMUNICATION TERMINAL INCLUDING THE PHOTOGRAPHING APPARATUS

(71) Applicant: Samsung Electronics Co., Ltd., Suwon-si, Gyeonggi-do (KR)

(72) Inventors: Douk-young Song, Suwon-si (KR); Bae-seok Lim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 14 days.

(21) Appl. No.: 15/007,888

(22) Filed: Jan. 27, 2016

(65) Prior Publication Data
US 2016/0223885 A1 Aug. 4, 2016

(30) Foreign Application Priority Data
Feb. 3, 2015 (KR) .................. 10-2015-0016734

(51) Int. Cl.
*G03B 17/17* (2006.01)
*H04N 5/232* (2006.01)
*H04N 5/225* (2006.01)
*G06F 1/16* (2006.01)
*G03B 29/00* (2006.01)

(52) U.S. Cl.
CPC ........... *G03B 17/17* (2013.01); *H04N 5/2252* (2013.01); *H04N 5/2254* (2013.01); *H04N 5/2256* (2013.01); *H04N 5/23245* (2013.01); *G03B 29/00* (2013.01); *G06F 1/1686* (2013.01)

(58) Field of Classification Search
None
See application file for complete search history.

(56) References Cited

U.S. PATENT DOCUMENTS

| | | | |
|---|---|---|---|
| 7,667,897 B2 | 2/2010 | Seo | |
| 7,889,435 B2 | 2/2011 | Seo | |
| 8,218,959 B2 | 7/2012 | Seo | |
| 9,195,816 B2 | 11/2015 | Ferren et al. | |
| 2002/0067426 A1* | 6/2002 | Nagata | H04N 5/2251 348/373 |
| 2006/0109567 A1* | 5/2006 | Chen | G02B 13/0065 359/696 |
| 2007/0127139 A1* | 6/2007 | Funahashi | G02B 7/102 359/696 |

(Continued)

FOREIGN PATENT DOCUMENTS

KR 10-1285474 B1 7/2013

*Primary Examiner* — Shahbaz Nazrul
(74) *Attorney, Agent, or Firm* — Jefferson IP Law, LLP

(57) ABSTRACT

A photographing apparatus, a method of operating the photographing apparatus, and a wireless communication terminal including the photographing apparatus are provided. The photographing apparatus includes a first incident unit to which a first light is incident, a second incident unit to which a second light different from the first light is incident, an image sensor to which the first light and the second light are incident, a first light path changing unit configured to change a path of the first light from the first incident unit to the image sensor, and a second light path changing unit configured to change a path of the second light from the second incident unit to the image sensor.

13 Claims, 21 Drawing Sheets

(56) References Cited

U.S. PATENT DOCUMENTS

| | | | |
|---|---|---|---|
| 2008/0019684 A1* | 1/2008 | Shyu | G03B 17/245 396/332 |
| 2008/0088942 A1* | 4/2008 | Seo | G02B 15/173 359/672 |
| 2008/0266443 A1* | 10/2008 | Lee | G02B 15/00 348/344 |
| 2009/0122179 A1* | 5/2009 | Nomura | H04N 5/2257 348/340 |
| 2009/0231537 A1* | 9/2009 | Yamamiya | G03B 17/00 349/200 |
| 2013/0093858 A1* | 4/2013 | Lee | G02B 27/283 348/49 |
| 2014/0055624 A1* | 2/2014 | Gaines | H04N 5/2254 348/207.1 |
| 2014/0218587 A1* | 8/2014 | Shah | G03B 5/00 348/340 |

* cited by examiner

PHOTOGRAPHING APPARATUS, METHOD OF OPERATING THE PHOTOGRAPHING APPARATUS, AND WIRELESS COMMUNICATION TERMINAL INCLUDING THE PHOTOGRAPHING APPARATUS

CROSS-REFERENCE TO RELATED APPLICATION(S)

This application claims the benefit under 35 U.S.C. §119 (a) of a Korean patent application filed on Feb. 3, 2015 in the Korean Intellectual Property Office and assigned Serial number 10-2015-0016734, the entire disclosure of which is hereby incorporated by reference.

TECHNICAL FIELD

The present disclosure relates to a photographing apparatus, a method of operating the photographing apparatus, and a wireless communication terminal including the photographing apparatus.

BACKGROUND

Wireless communication terminals are portable electronic devices having one or more functions such as a voice and video call function, an information input/output (I/O) function, a data storage function, and the like. As wireless communication terminals have diverse functions, the wireless communication terminals are implemented as multimedia devices having complicated functions such as capturing still or moving images, reproducing music or moving image files, receiving broadcast programs, displaying games, and the like.

The wireless communication terminals may employ one or more small and lightweight photographing device modules to perform multimedia functions. In particular, photographing device modules have recently been provided in front and rear surfaces of wireless communication terminals and thus one of the photographing device modules may be used according to a selection of a photographing mode.

However, a plurality of photographing device modules are provided in front and rear surfaces of a wireless communication terminal, and an image sensor may be provided in each of the plurality of photographing device modules, which may cause an increase in an entire size of the wireless communication terminal and an increase in manufacturing costs of the wireless communication terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a photographing apparatus, a method of operating the photographing apparatus, and a wireless communication terminal including the photographing apparatus.

Additional aspects will be set forth in part in the description which follows and, in part, will be apparent from the description, or may be learned by practice of the presented embodiments.

In accordance with an aspect of the present disclosure, a photographing apparatus is provided. The photographing apparatus includes a first incident unit to which a first light is incident, a second incident unit to which a second light different from the first light is incident, an image sensor to which the first light and the second light are incident, a first light path changing unit configured to change a path of the first light from the first incident unit to the image sensor, and a second light path changing unit configured to change a path of the second light from the second incident unit to the image sensor.

In accordance with another aspect of the present disclosure, a method of operating a photographing apparatus is provided. The method includes receiving an input signal with respect to an operating mode of the photographing apparatus, determining a moving degree of a light path changing unit according to the operating mode of the photographing apparatus, moving the light path changing unit, and performing photographing according to the operating mode of the photographing apparatus by using the input signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein will be briefly described, and the inventive concept will be described in detail below.

General and widely-used terms have been employed herein, in consideration of functions provided in the inventive concept, and may vary according to an intention of one of ordinary skill in the art, a precedent, or emergence of new technologies. Additionally, in some cases, an applicant may arbitrarily select specific terms. Then, the applicant will provide the meaning of the terms in the description of the inventive concept. Accordingly, it will be understood that the terms, used herein, should be interpreted as having a meaning that is consistent with their meaning in the context of the relevant art and will not be interpreted in an idealized or overly formal sense unless expressly so defined herein.

Figure 1A:
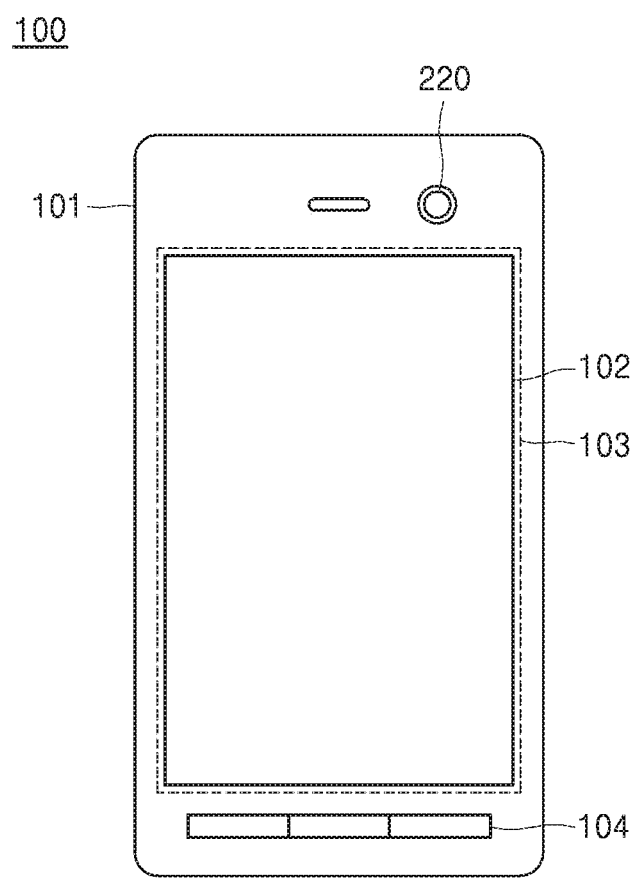
FIGS. 1A and 1B are front and rear views, respectively, illustrating a wireless communication terminal according to an embodiment of the present disclosure.
Figure 1B:
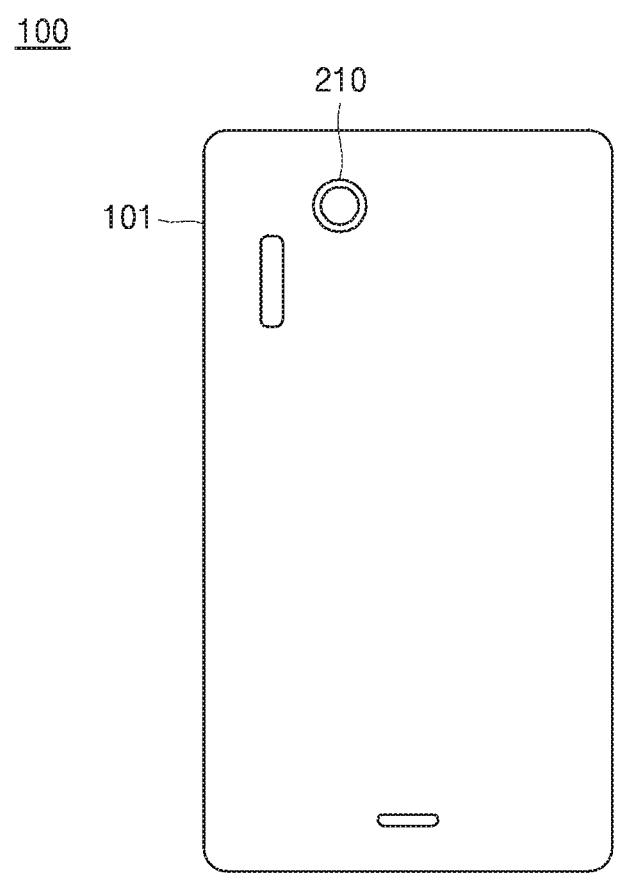

FIGS. 1A and 1B are front and rear views, respectively, illustrating a wireless communication terminal according to an embodiment of the present disclosure.

Referring to FIGS. 1A and 1B, a wireless communication terminal 100 is illustrated in the form of a smart phone, but is not limited thereto. The wireless communication terminal 100 according to the embodiment of the present disclosure may be in the form of a feature phone, a portable game terminal, a tablet personal computer (PC), in addition to the smart phone. The wireless communication terminal 100 may include a housing 101, a display panel 102 provided on a front surface of the housing 101, a touch panel overlapped with the display panel 102, a manipulation button 104, and a first incident unit 210 provided in a rear surface of the housing 101 and a second incident unit 220 provided in a front surface of the housing 101.

In the embodiment of the present disclosure, when a subject is photographed by using the first incident unit 210, a main surface facing the subject is defined as a "rear surface", and another main surface on an opposite side is defined as a "front surface".

The display panel 102 may be an output unit for outputting a preview image and a photographing image of the subject with respect to a photographing apparatus 200 (see FIG. 2) and outputting information necessary for manipulating the photographing apparatus 200 (see FIG. 2) and may include, for example, an organic light-emitting diode panel, a liquid crystal displays (LCD) panel, etc.

A touch panel 103 may be provided on a front portion of the display panel 102 to cover a display surface of the display panel 102 or may be provided on a rear portion of the display panel 102. A user's finger or an exclusive manipulation pen (stylus) manipulated by a user, and the like, may be in contact with a touch region of the display panel 102, thereby intuitively manipulating the photographing apparatus 200 (see FIG. 2).

Figure 2:
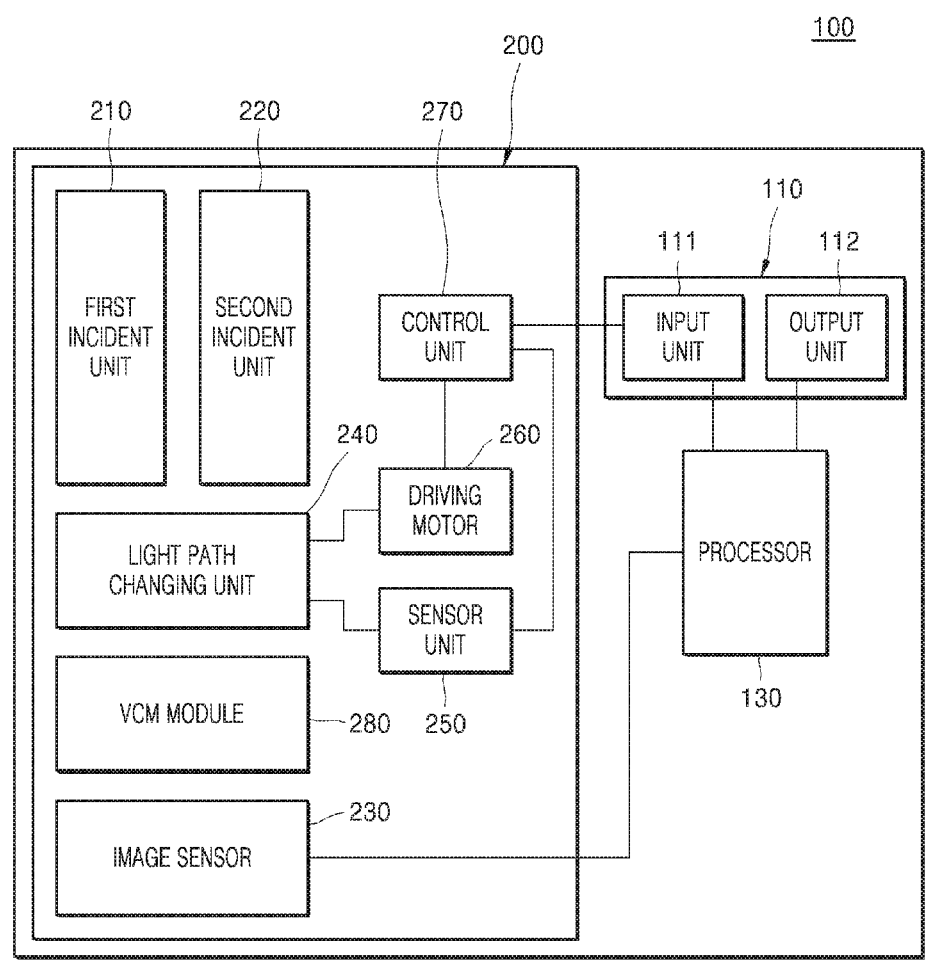
FIG. 2 is a block diagram illustrating a wireless communication terminal according to an embodiment of the present disclosure.

The manipulation button 104 may be used for an auxiliary manipulation of the photographing apparatus 200 (see FIG. 2). The manipulation button 104 may not be provided according to the wireless communication terminal 100.

The first incident unit 210 may be a main photographing incident unit located in the rear surface of the housing 101. The second incident unit 220 may be a sub photographing incident unit located in the front surface of the housing 101. A photographing mode may be determined according to whether the subject is located in the front or rear of the wireless communication terminal 100. The first incident unit 210 or the second incident unit 220 may be used according to the photographing mode. The elements included in the wireless communication terminal 100 will be described in more detail in relation to the photographing apparatus 200 (see FIG. 2) included in the wireless communication terminal 100 below.

FIG. 2 is a block diagram illustrating a wireless communication terminal according to an embodiment of the present disclosure.

Referring to FIG. 2, the wireless communication terminal 100 according to an embodiment may include a user interface 110 including an input unit 111 and an output unit 112, a processor 130, and the photographing apparatus 200. The input unit 111 may be an input member for inputting a user instruction, and may be formed as, for example, the touch panel 103 or the manipulation button 104 of FIGS. 1A and 1B. However, the embodiment is not limited thereto. The input unit 110 may be formed as a random input apparatus such as a switch, a key pad, and the like.

The output unit 112 may be a display panel for displaying an image that is output by the wireless communication terminal 100 and may be formed as, for example, an organic light-emitting diode panel, a LCD panel, etc. of FIGS. 1A and 1B. The user interface 110 including the input unit 111 and the output unit 112 may include an input/output (I/O) port for connecting human interface devices (HIDs) and an I/O port for inputting/outputting an image.

The processor 130 may read programs stored in a memory (not shown) and perform a process of implementing various functions of the wireless communication terminal 100. For example, the processor 130 may read and execute an operating system (OS) program from the memory (not shown) and simultaneously execute an application program based on an operation of the OS program.

The photographing apparatus 200 may be an apparatus for displaying an image on the output unit 112 by using light incident from the subject. The photographing apparatus 200 according to an embodiment may include a first incident unit 210 and a second incident unit 220 that have different paths of the light incident from the subject, an image sensor 230 for accommodating the light incident from the first incident unit 210 and the second incident unit 220, one or more light path changing unit 240 for changing paths of the light incident from the first incident unit 210 and the second incident unit 220 according to a photographing mode, a sensor unit 250 for detecting a location of the light path changing unit 240, a driving motor 260 for generating power used to move the light path changing unit 240, a control unit 270 for controlling the driving motor 260, and a voice coil motor (VCM) module 280.

The first incident unit 210 and the second incident unit 220 may be optical members for allowing light reflected from the subject to be incident thereto. According to an embodiment, the first incident unit 210 and the second incident unit 220 may be provided in different directions to allow the light incident from the subject to pass therethrough in different directions. For example, as shown in FIGS. 1A and 1B, the first incident unit 210 and the second incident unit 220 may be provided in a front or rear surface of the wireless communication terminal 100 so that light reflected from a subject located in the front or rear surface of the wireless communication terminal 100 may be respectively incident to the first incident unit 210 or the second incident unit 220.

The image sensor 230 may be a photographing device for converting the light incident from the first incident unit 210 or the second incident unit 220 into an electrical signal. A size of the image sensor 230 may be determined in relation to a diagonal length of the image sensor 230. The greater the size of the image sensor 230 is, the higher the quality of the image that may be acquired. For example, the image sensor 230 may be a charge coupled device (CCD) image sensor or a complementary metal oxide semiconductor (CMOS) image sensor.

The single image sensor 230 is provided in the photographing apparatus 200 according to an embodiment, and thus the light incident from the first incident unit 210 and the second incident unit 220 may be incident to the one image sensor 230. For example, light incident from the first incident unit 210 and the second incident unit 220 through different light paths may be incident to the one image sensor 230 by changing light paths using the light path changing unit 240 that will be described later. In this regard, the light incident from the first incident unit 210 and the second incident unit 220 may be selectively incident to the one image sensor 230 according to a photographing mode that is input through the input unit 111.

For example, the light path changing unit 240 according to an embodiment may include a first light path changing unit and a second light path changing unit that will be described later. The first light path changing unit and the second light path changing unit may be provided to face the first incident unit 210 or the second incident unit 220, thereby changing light paths of the light incident from the first incident unit 210 and the second incident unit 220.

The one or more light path changing unit 240 may include an optical member for changing a light path of the light incident from the first incident unit 210 or the second incident unit 220. For example, the light path changing unit 240 may include a mirror used as a reflection member or a prism for converting a direction of the incident light, and the like.

The sensor unit 250 may be a sensing apparatus for sensing a location of the light path changing unit 240. The sensor unit 250 may sense the location of the light path changing unit 240 in order to change a position of the light path changing unit 240. For example, the sensor unit 250 may include an optical sensor or a magnetic sensor, and the like for sensing the location of the light path changing unit 240 but the embodiment is not limited thereto.

The driving motor 260 may be a driving member for moving the location of the light path changing unit 240. The driving motor 260 may move the location of the light path changing unit 240 in order to change the position of the light path changing unit 240 according to the photographing mode. For example, the driving motor 260 may include a step motor or a piezo motor, etc. for moving the location of the light path changing unit 240 but the embodiment is not limited thereto.

The control unit 270 may be used to control driving of the driving motor 260 according to a location signal of the light path changing unit 240 that is sensed by the sensor unit 250 and an input signal that is input to the input unit 111. For example, the control unit 270 may generate a control signal for controlling the driving motor 270 according to the location signal of the light path changing unit 240 and the input signal and, may change the location of the light path changing unit 240.

The VCM module 280 may provide an auto focus function of controlling a distance between a focus lens unit (not shown) and the image sensor 230 by using a driving characteristic of a VCM. For example, the VCM module 280 may include a spring, a coil, and a magnet, and move the focus lens unit in a light axis direction according to current and a magnetic field.

Figure 3A:
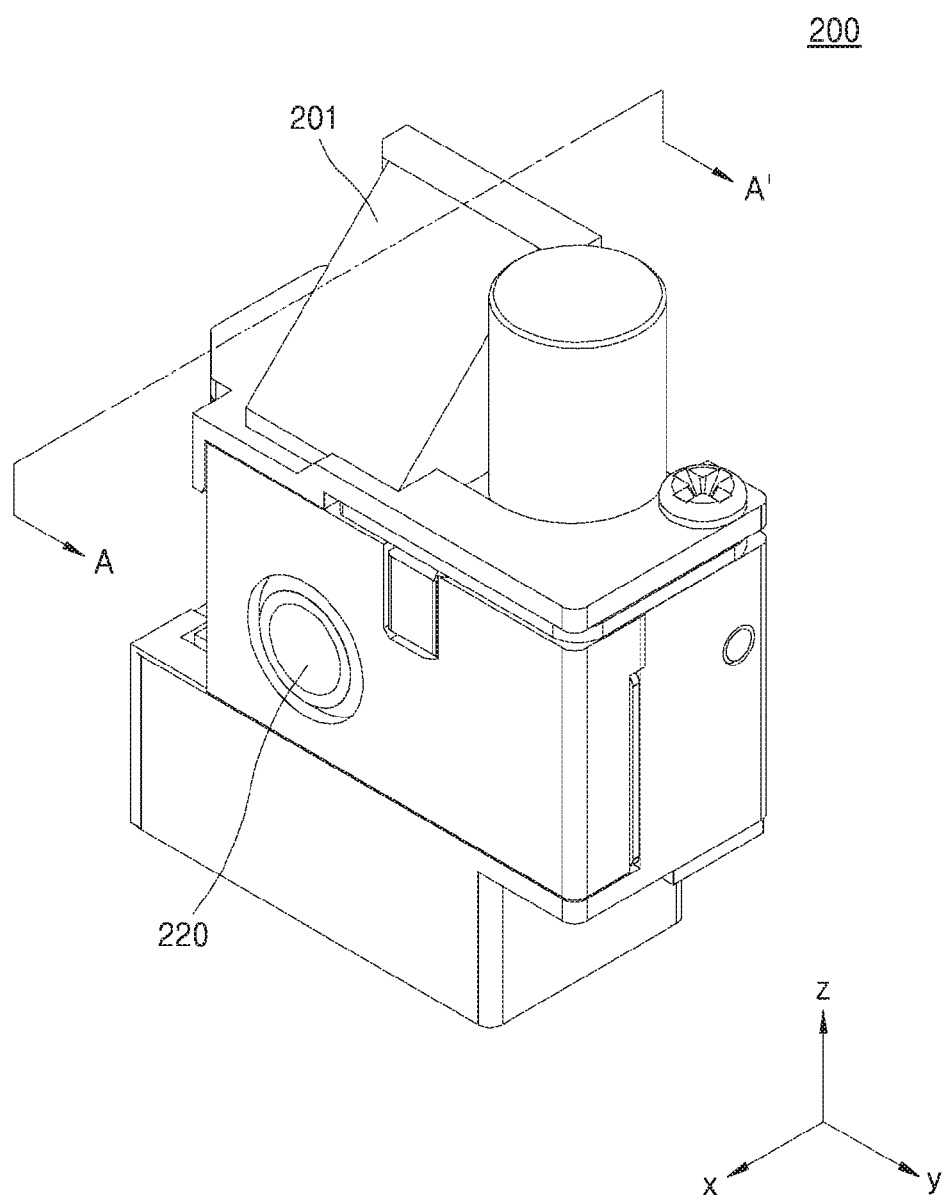
FIGS. 3A and 3B are perspective views of a photographing apparatus according to an embodiment of the present disclosure.
Figure 3B:
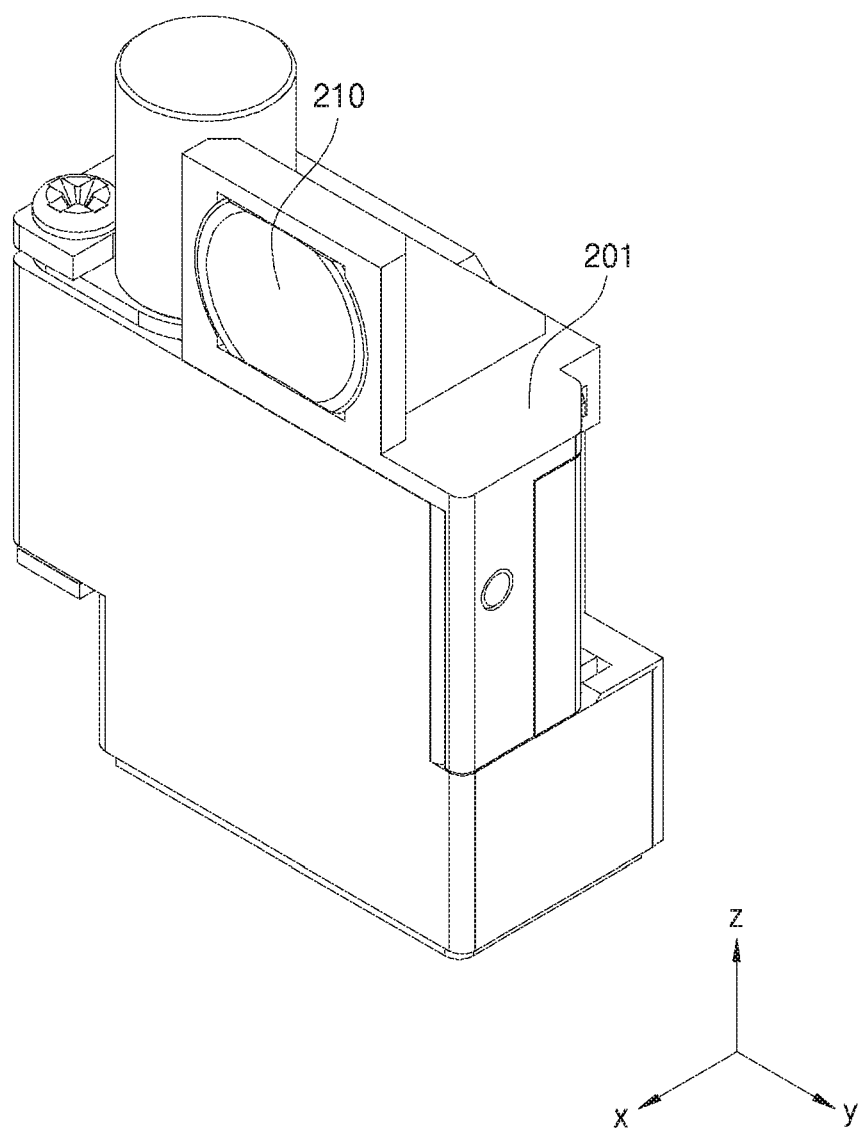

FIGS. 3A and 3B are perspective views of a photographing apparatus according to an embodiment of the present disclosure.

Figure 4:
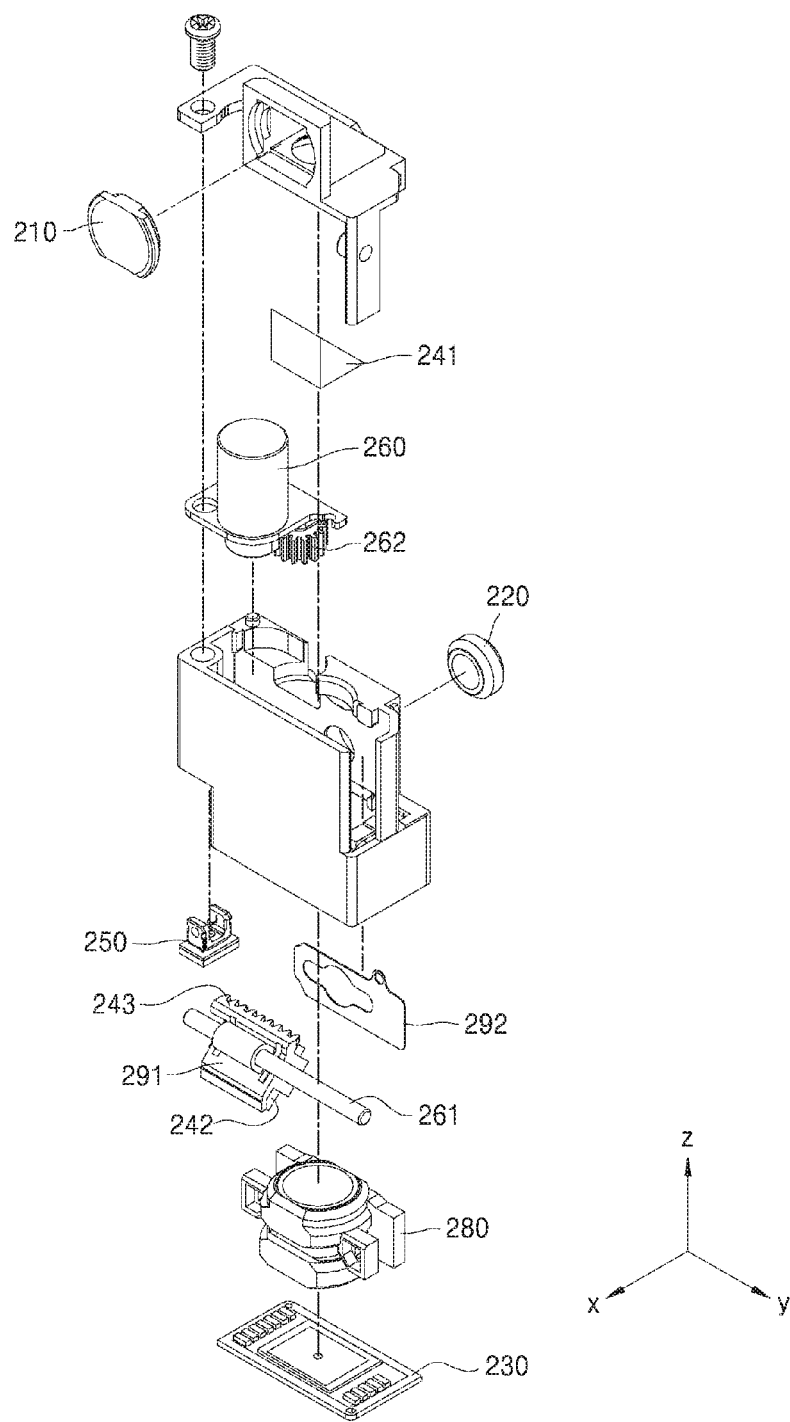
FIG. 4 is an exploded perspective view of a photographing apparatus of FIGS. 3A and 3B according to an embodiment of the present disclosure.

FIG. 4 is an exploded perspective view of a photographing apparatus of FIGS. 3A and 3B according to an embodiment of the present disclosure.

For convenience of description, a direction in which light is incident to the first incident unit 210 or the second incident unit 220 is defined as an X axis, a direction in which light is incident to an image sensor 230 is defined as a Z axis, and a direction in perpendicular to the X axis and the Z axis is defined as a Y axis below.

Referring to FIGS. 3A, 3B, and 4, the photographing apparatus 200 according to an embodiment may include a housing 201 in a prismatic shape, the first incident unit 210, the second incident unit 220, the image sensor 230, a first light path changing unit 241 and a second light path changing unit 242 that change light incident to the first incident unit 210 and the second incident unit 220, the sensor unit 250, the driving motor 260, the VCM module 280, a first block member 291, and a second block member 292.

The first incident unit 210 and the second incident unit 220 may be respectively formed in front and rear surfaces of the housing 210. Accordingly, light that is reflected from a subject may be incident to the first incident unit 210 and the second incident unit 220 in an X axis direction. According to the embodiment of the present disclosure, the first incident unit 210 and the second incident unit 220 may be spaced apart from each other by a predetermined gap along the Z axis.

The first light path changing unit 241 may be provided to face the first incident unit 210 to change a path of the light incident to the first incident unit 210. According to the embodiment of the present disclosure, the first light path changing unit 241 may be fixed to the first incident unit 210 and may include a prism as an optical member for changing the path of the light incident to the first incident unit 210.

The second light path changing unit 242 may be provided to face the second incident unit 220 according to a photographing mode to change a path of the light incident to the second incident unit 220. According to the embodiment of the present disclosure, the second light path changing unit 242 may include a mirror as a reflection member for changing the path of the light incident to the second incident unit 220. The second light path changing unit 242 may be provided to be fixed to a first support unit 243. The first support unit 243 may be provided to slide on a shaft 261 extending in a Y axis direction, and thus the second light path changing unit 242, along with the first support unit 243, may be moved in the Y axis direction.

The sensor unit 250 may be provided to sense a location of the second light path changing unit 242. For example, the sensor unit 250 may be implemented as a photo interrupter (PI) sensor and may be provided in one end of the shaft 261 to sense the location of the second light path changing unit 242.

The driving motor 260 may generate power for moving the location of the second light path changing unit 242. For example, the driving motor 260 may be implemented as a step motor and may transfer the generated power to the first support unit 243 by connecting a driving shaft 262 of the driving motor 260 and one end of the first support unit 243. Accordingly, the first support unit 243 and the second light path changing unit 242 fixed to the first support unit 243 may be moved in the Y axis direction.

The VCM module 280 and the image sensor 230 may be sequentially provided in a Z axis direction to perform an auto focusing function and may convert the light incident to the first incident unit 210 and the second incident unit 220 into an electrical signal. However, the VCM module 280 is not necessarily provided and may be removed if necessary.

The first and second block members 291 and 292 may be block members for blocking the light incident to the first incident unit 210 or the second incident unit 220 according to the photographing mode. According to the embodiment of the present disclosure, the first and second block members 291 and 292 may be fixed to the first support unit 243 to block light incident from the first incident unit 210 or the second incident unit 220 from being incident to the image sensor 230 according to the photographing mode. For example, the first block member 291 may be provided in an upper portion of the first support unit 243 to prevent the light incident from the first incident unit 210 from being incident to the image sensor 230. In this regard, the first block member 291 may be formed as a block plate in a plate shape for blocking light.

The second block member 292 may be disposed between the second incident unit 220 and the second light path changing unit 242 to prevent the light incident from the second incident unit 220 from being incident to the image sensor 230. In this regard, the second block member 292 may be formed as a shutter film for blocking light, may be formed of a flexible material, and may be accommodated in the housing 201 irrespective of a shape of the housing 201. In addition, the second block member 292 may be fixed to the first support unit 243 and may be moved, along with the first support unit 243, according to the photographing mode.

Figure 5A:
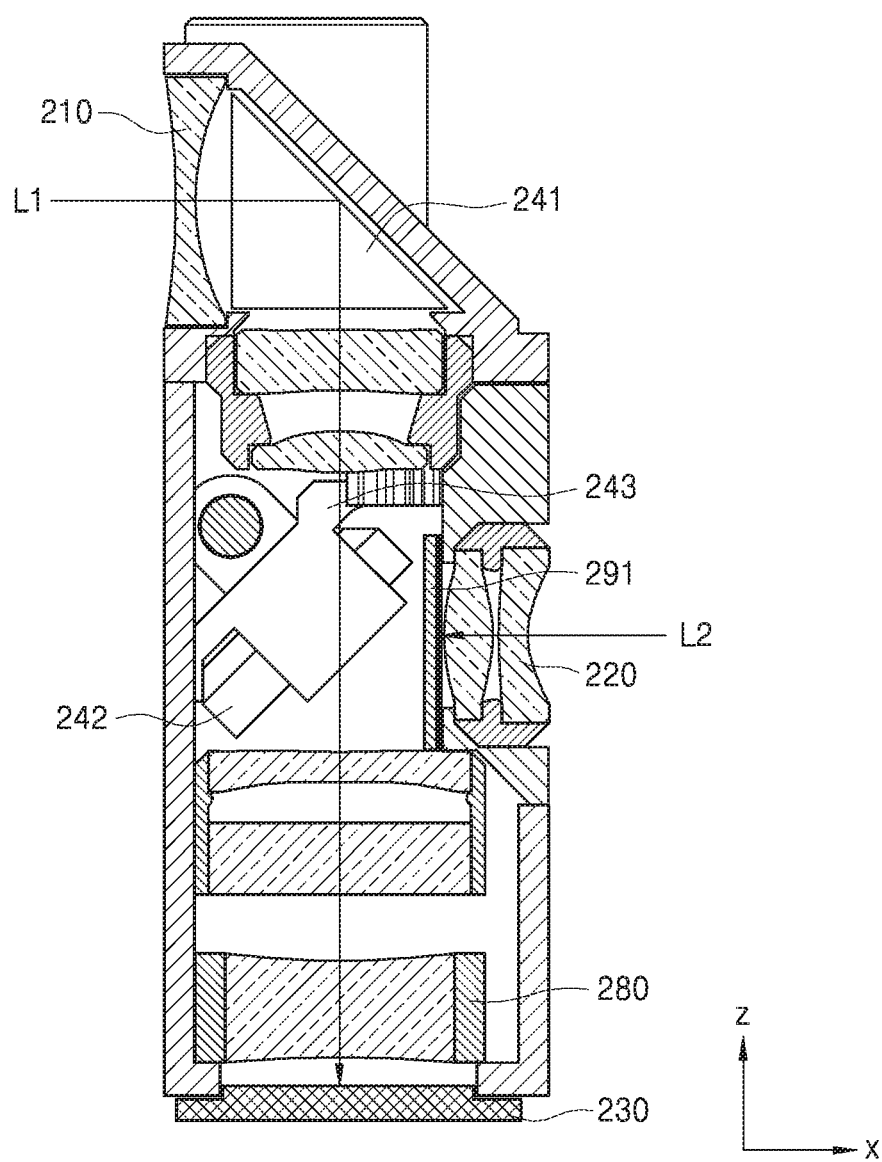
FIG. 5A is a cross-sectional view of a photographing apparatus of FIG. 3A taken along a line A-A' according to an embodiment of the present disclosure.

FIG. 5A is a cross-sectional view of a photographing apparatus of FIG. 3A taken along a line A-A' according to an embodiment of the present disclosure.

Figure 5B:
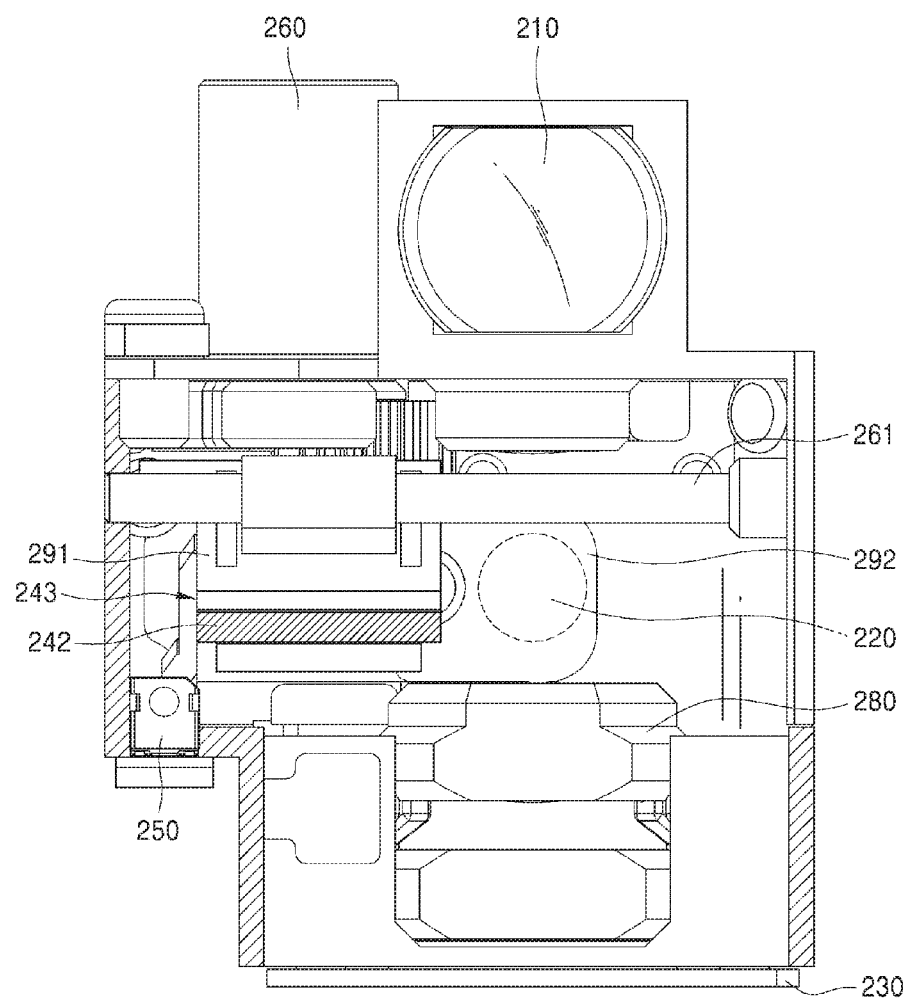
FIG. 5B is a cross-sectional front view of a photographing apparatus according to an embodiment of the present disclosure.

FIG. 5B is a cross-sectional front view of a photographing apparatus according to an embodiment of the present disclosure. As described above, a user may input a photographing mode of the photographing apparatus 200 through the input unit 111, and an incident unit used for photographing may be determined according to the photographing mode input by the user. A case in which the first incident unit 210 is used is defined as a first photographing mode, and a case in which the second incident unit 220 is used is defined as a second photographing mode below.

Referring to FIGS. 5A and 5B, a first light L1 may be incident to the first incident unit 210 in an X axis direction in the first photographing mode. The first light L1 incident to the first incident unit 210 may be incident to the first light path changing unit 241 so that a light path may be changed in a Z axis direction. Thereafter, the first light L1 that the light path is changed by the first light path changing unit 241 may be moved in the Z axis direction and may be incident to the image sensor 230 via the VCM module 280.

The second light path changing unit 242 may be provided to be positioned beyond a path of the first light L1, formed between the first light path changing unit 241 and the image sensor 230, in order not to block the first light L1 that has passed through the first light path changing unit 241 from traveling in the first photographing mode. For example, the second light path changing unit 242 may be provided in a side portion of the path of the first light L1 formed between the first light path changing unit 241 and the image sensor 230, and thus traveling of the first light L1 may not be impeded. The second incident unit 220 may be blocked by the second block member 292 in the first photographing mode so a second light L2 incident to the second incident unit 220 may not be incident to the image sensor 230. Accordingly, the first light L1 incident to the first incident unit 210 may be incident to the image sensor 230 without interference of the second light L2, and photographing may be performed by using the first incident unit 210 in the first photographing mode.

Figure 6A:
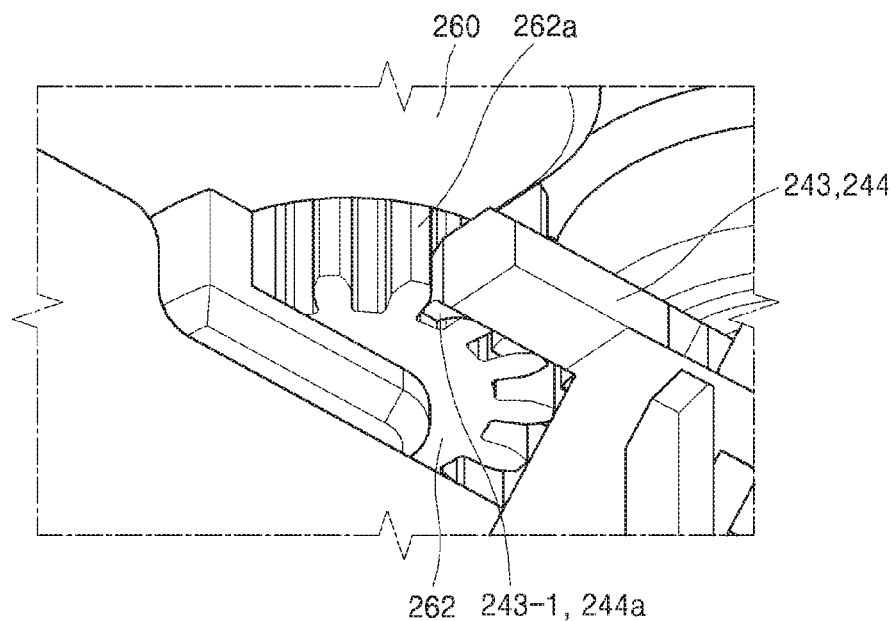
FIGS. 6A to 6C are partial perspective views of a photographing apparatus according to an embodiment of the present disclosure.
Figure 6B:
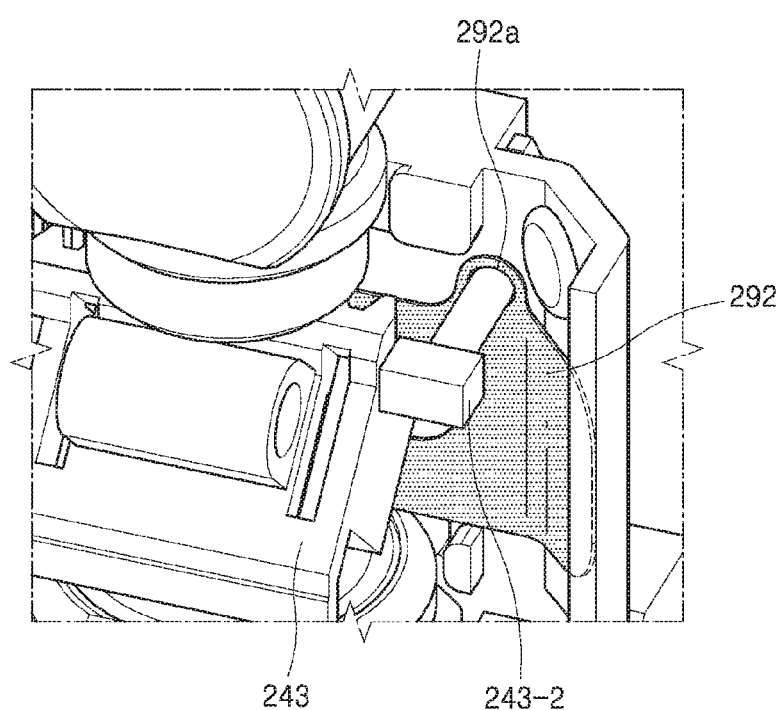
Figure 6C:
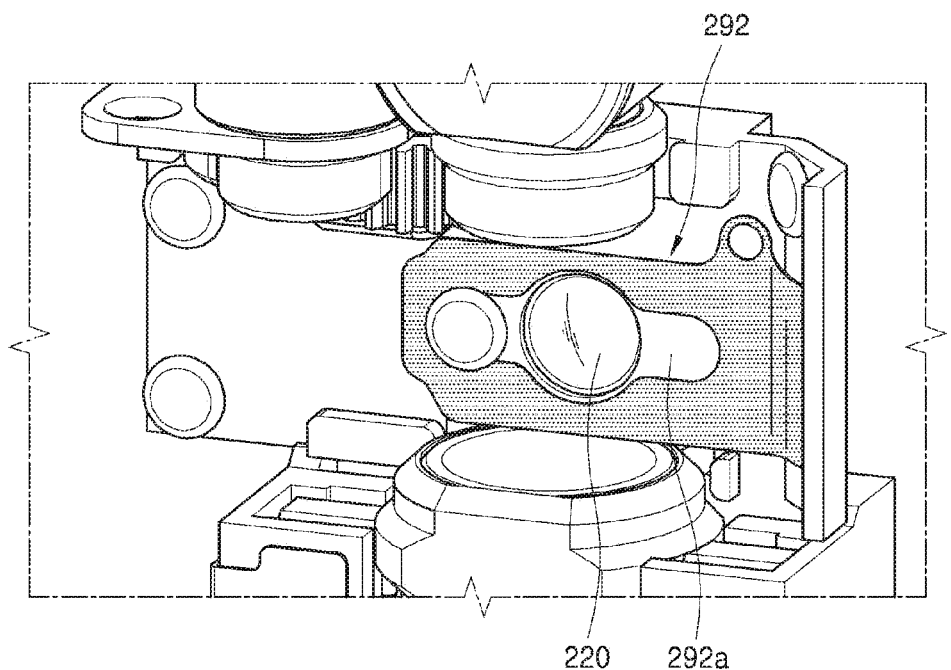

FIGS. 6A to 6C are partial perspective views of a photographing apparatus according to an embodiment of the present disclosure.

Figure 7:
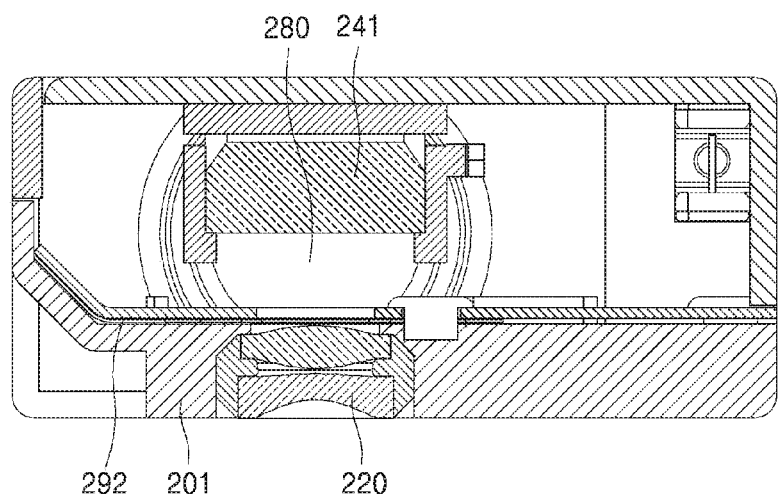
FIG. 7 is a cross-sectional plan view of a photographing apparatus according to an embodiment of the present disclosure.

FIG. 7 is a cross-sectional plan view of a photographing apparatus according to an embodiment of the present disclosure.

Referring to FIGS. 4 and 6A, in a case where a signal for converting a first photographing mode into a second photographing mode is input to the photographing apparatus 200, blocking may be released with respect to the second incident unit such that the second light L2 incident to the second incident unit 220 may be incident to the image sensor 230, and thus photographing may be performed by using the second incident unit 220 in the second photographing mode. For example, referring to FIG. 2, the input unit 111 may transfer the input signal with respect to conversion of a photographing mode to the control unit 270, and the sensor unit 250 may transfer a location signal of the second light path changing unit 242 to the control unit 270. The control unit 270 may analyze the received input signal and the location signal of the second light path changing unit 242 and transfer a driving signal for moving the second light path changing unit 242 to the driving motor 260. The driving motor 260 may generate power according to the driving signal received from the control unit 270.

A pinion gear 262a may be provided in one end of the driving shaft 262 of the driving motor 260, and a rack gear 243-1 may be provided in one end of the first support unit 243. The rack gear 243-1 and the pinion gear 262a may be engaged into each other, and thus the power generated by the driving motor 260 may be transferred to the first support unit 243. The first support unit 243 may be moved in a Y axis direction by the driving motor 260. The second light path changing unit 242 fixed to the first support unit 243 may also be moved in the Y axis direction. A rack gear 244a may be provided in one end of the second support unit 244.

Referring to FIG. 6B, a fixing unit 243-2 of a cylindrical shape formed in another end of the first support unit 243 may be inserted into an opening 292a formed in the second block member 292 so that the second block member 292 may be fixed to the first support unit 243. Accordingly, in a case where the first support unit 243 is moved in the Y axis direction by the driving motor 260, the second block member 292 fixed to the first support unit 243 may also be moved in the Y axis direction, and thus a path of the second light L2 passed through the second incident unit 220 may be opened, and the photographing apparatus 200 may be converted from a first photographing mode to a second photographing mode.

Referring to FIG. 6C, for example, a light window 292a through which the second light L2 incident to the second incident unit 220 passes may be provided in the second block member 292 to face the second incident unit 220. In a case where the second block member 292 is moved in the Y axis direction, the light window 292a formed in the second block member 292 and the second incident unit 220 may overlap each other so that the second incident unit 220 may be opened, and thus the second light L2 may be incident through the second incident unit 220.

In a case where the photographing apparatus 200 is converted from the first photographing mode to the second photographing mode, the second block member 292 may be accommodated in the housing 201.

Referring to FIG. 7, for example, in a case where the second block member 292 is formed as a flexible shutter film, since the second block member 292 may be bent along an outer wall portion of the housing 201, the second block member 292 may be accommodated in the housing 201 without an additional space in the Y axis direction.

Figure 8A:
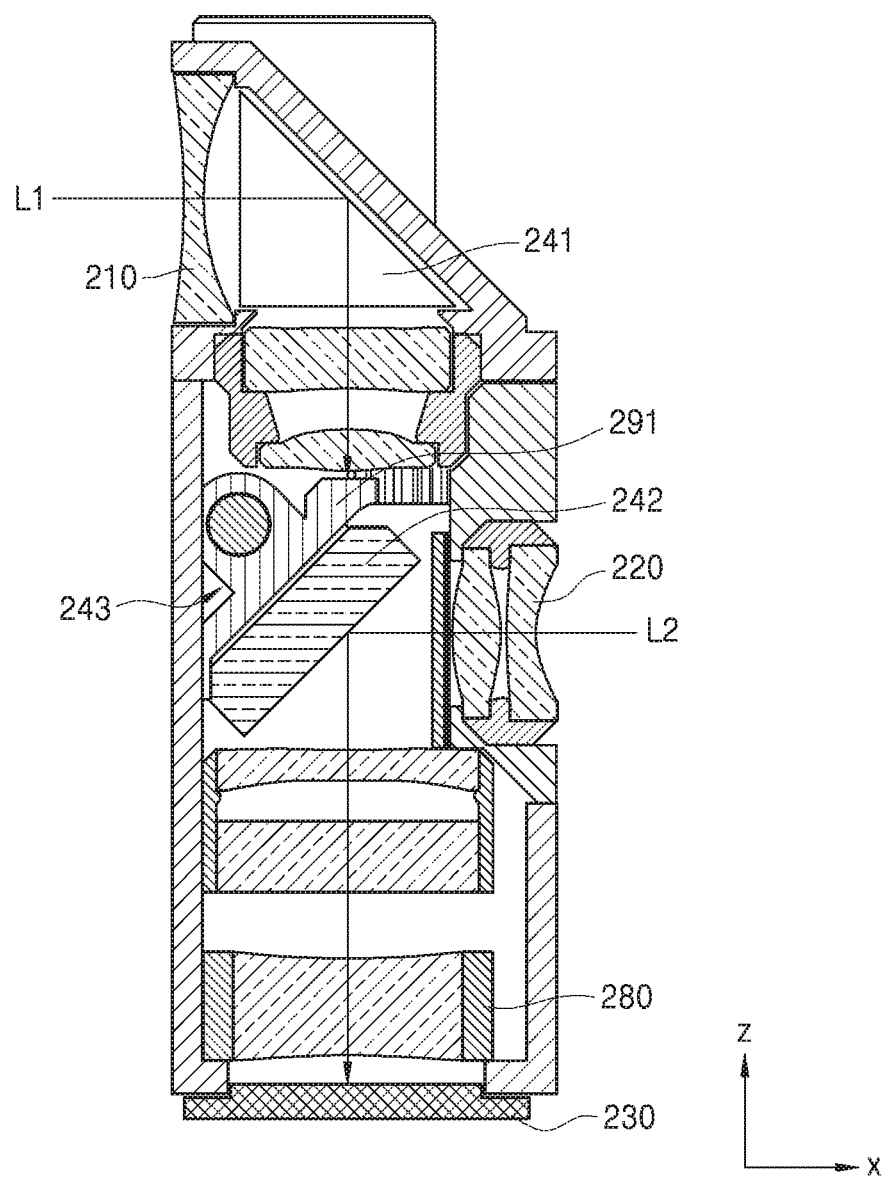
FIG. 8A is a cross-sectional view of a photographing apparatus of FIG. 3A taken along a line A-A' according to another embodiment of the present disclosure.

FIG. 8A is a cross-sectional view of a photographing apparatus of FIG. 3A taken along the line A-A' according to another embodiment of the present disclosure.

Figure 8B:
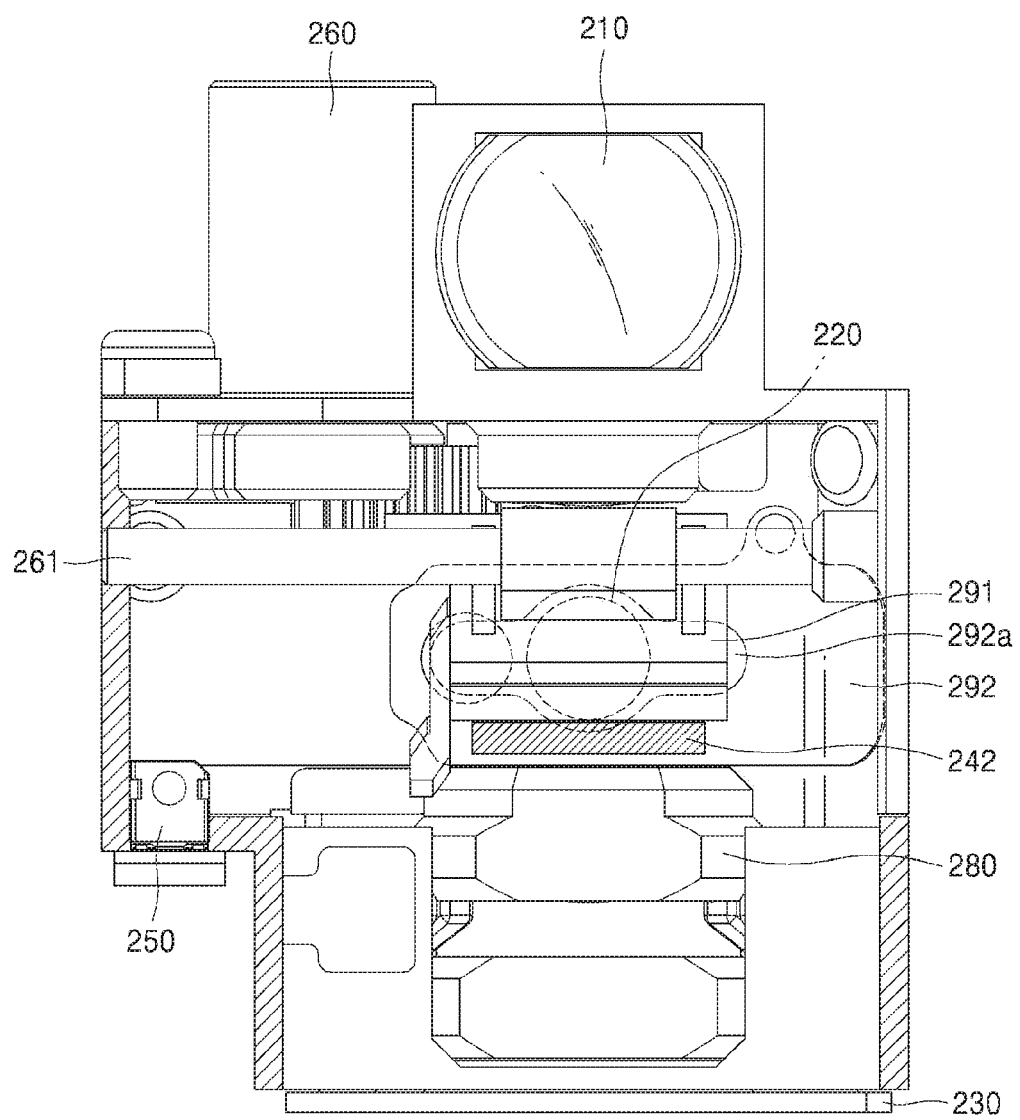
FIG. 8B is a cross-sectional front view of a photographing apparatus according to an embodiment of the present disclosure.

FIG. 8B is a cross-sectional front view of a photographing apparatus according to an embodiment of the present disclosure.

Referring to FIGS. 8A and 8B, the second light path changing unit 242 may be moved in a Y axis direction to face the second incident unit 220 in a second photographing mode in order to change a path of the second light L2 incident through the second incident unit 220. The second block member 292 may also be moved in the Y axis direction so that blocking may be released with respect to the second incident unit 220.

In the second photographing mode, the second light L2 may be incident to the second incident unit 220 in an X axis direction and then may be incident to the second light path changing unit 242 through the light window 292a, and thus the path of the second light L2 may be changed to a Z axis direction. Thereafter, the second light L2 exited from the second light path changing unit 242 may be moved in the Z axis direction and may be incident to the image sensor 230 through the VCM module 280.

The second light path changing unit 242 may be moved in the Y axis direction to face the second incident unit 220 so that the first block member 291 provided in an upper portion of the second light path changing unit 242 may be disposed between the first light path changing unit 241 and the image sensor 230. Accordingly, the first light L1 passed through the first incident unit 210 may be blocked by the first block member 291 after having passed through the first light path changing unit 241, and thus the first light L1 may not be incident to the image sensor 230. Thus, in the second photographing mode, the first light L1 incident through the first incident unit 210 may not be incident to the image sensor 230, whereas the second light L2 incident through the second incident unit 220 may be incident to the image sensor 230 without interference of the first light L1.

As described above, according to the embodiment, only the one image sensor 230 may be provided in the photographing apparatus 200 with respect to the plurality of incident units 210 and 220, thereby reducing an entire size of the photographing apparatus 200. An area of the image sensor 230 used in the first and second incident units 210 and 220 may be relatively large, thereby increasing quality of an output image.

Only the second light path changing unit 242 may be moved to block or release light incident to the first incident unit 210 or the second incident unit 220 according to a photographing mode according to the embodiment but the various embodiments are not limited thereto. According to another embodiment, not only the second light path changing unit 242 but also the first light path changing unit 241 may be moved to block or release the light incident to the first incident unit 210 or the second incident unit 220 according to the photographing mode.

Figure 9A:
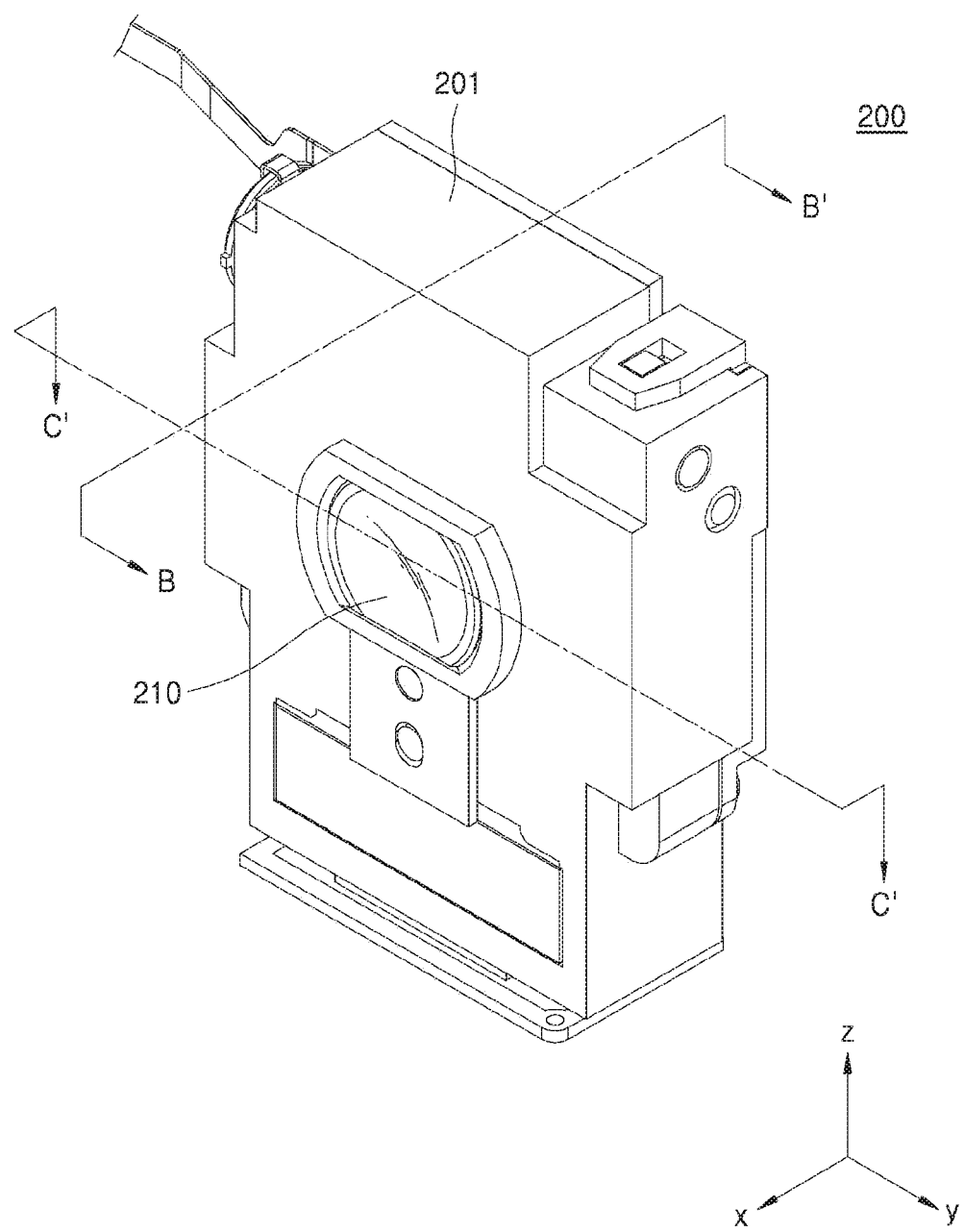
FIGS. 9A and 9B are perspective views of a photographing apparatus according to another embodiment of the present disclosure.
Figure 9B:
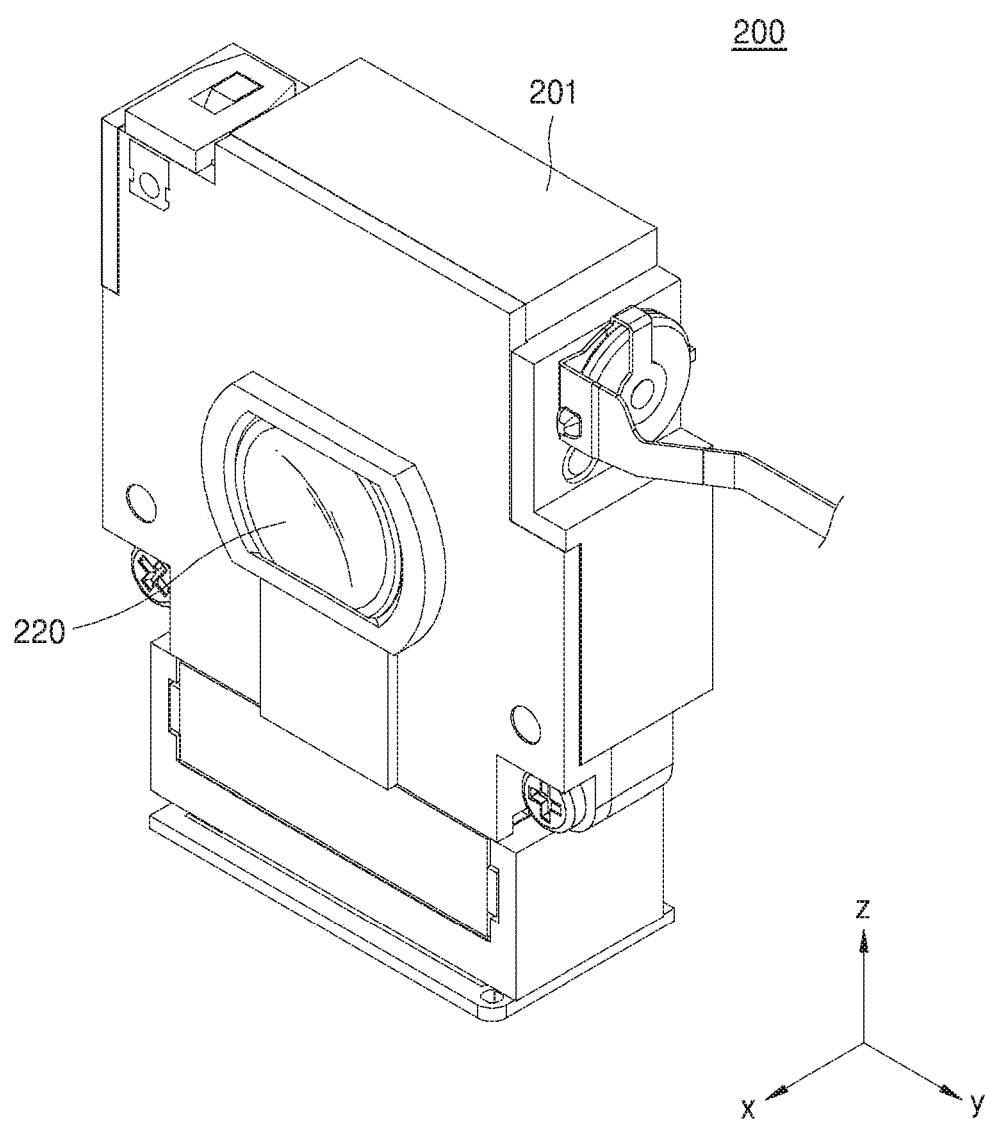

FIGS. 9A and 9B are perspective views of a photographing apparatus according to another embodiment of the present disclosure.

Figure 10:
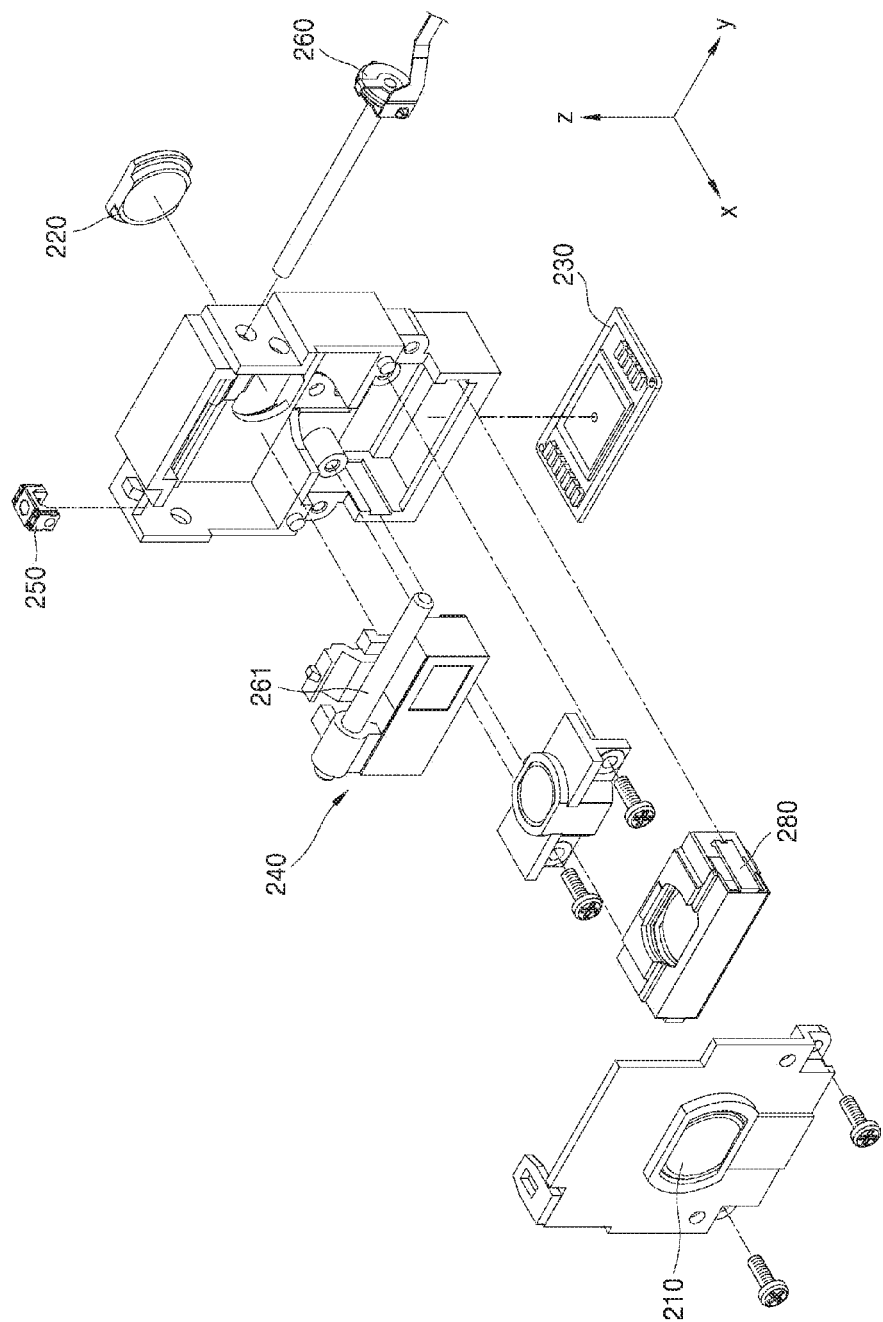
FIG. 10 is an exploded perspective view of a photographing apparatus of FIGS. 9A and 9B according to an embodiment of the present disclosure.

FIG. 10 is an exploded perspective view of the photographing apparatus of FIGS. 9A and 9B according to an embodiment of the present disclosure.

Figure 11A:
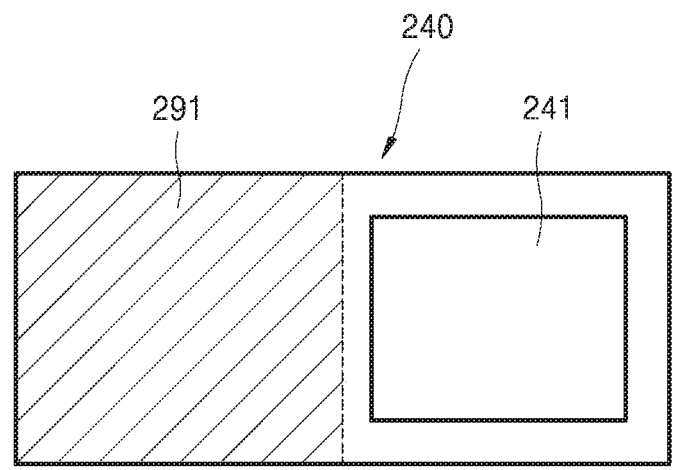
FIGS. 11A and 11B are schematic views of light path changing units of FIG. 10 according to an embodiment of the present disclosure.
Figure 11B:
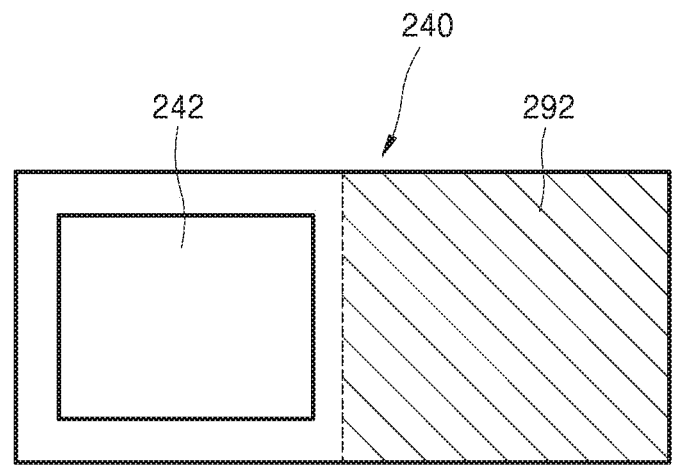

FIGS. 11A and 11B are schematic views of light path changing units of FIG. 10 according to an embodiment of the present disclosure. For convenience of description, the same elements denote the same reference numerals between FIGS. 3A through 8B and FIGS. 9A through 11B, and thus redundant descriptions thereof are omitted.

Referring to FIGS. 9A through 11B, the first incident unit 210 and the second incident unit 220 according to another embodiment may be disposed to face each other and may be respectively formed in front and rear surfaces of the housing 201. Light reflected from a subject may be incident to the first incident unit 210 and the second incident unit 220 in an X axis direction. However, the present embodiment is not limited thereto. The first incident unit 210 and the second incident unit 220 may be respectively formed in the front and rear surfaces of the housing 201 in a Y axis direction by a predetermined gap.

According to another embodiment, the first light path changing unit 241 and the second light path changing unit 242 may be fixed to a second support unit 244 to change paths of the first light L1 and the second light L2 that are incident through the first incident unit 210 and the second incident unit 220. For example, a prism may be provided as an optical member for changing paths of light incident to the first incident unit 210 and the second incident unit 220. The prism is used as the optical member included in the first incident unit 210 and the second incident unit 220 but is not limited thereto. An arbitrary optical member for changing the paths of the first light L1 and the second light L2 that are incident to the first incident unit 210 and the second incident unit 220 may be provided.

The shaft 261 extending in the Y axis direction may be disposed between the first incident unit 210 and the second incident unit 220. The second support unit 244 may be provided to slide on the shaft 261. Thus, the first light path changing unit 241 and the second light path changing unit 242 that are fixed to the second support unit 244 may be moved in the Y axis direction according to a photographing mode of the photographing apparatus 200.

The sensor unit 250 may sense locations of the first light path changing unit 241 and the second light path changing unit 242. For example, the sensor unit 250 may be implemented as a PI sensor, may be provided in one end of the second support unit 244, and may sense a movement of the second support unit 244 in the Y axis direction so that the sensor unit 250 may sense the locations of the first light path changing unit 241 and the second light path changing unit 242 that are fixed to the second support unit 244.

The driving motor 260 may generate power for moving the locations of the first light path changing unit 241 and the second light path changing unit 242. For example, the driving motor 260 may be implemented as a step motor, and, as shown in FIG. 6A, the driving shaft 262 of the driving motor 260 and one end of the second support unit 244 may be connected to transfer the power generated by the driving motor 260 to the second support unit 244. Accordingly, the second support unit 244 and the first light path changing unit 241 and the second light path changing unit 242 that are fixed to the second support unit 244 may be moved in the Y axis direction.

The first and second block members 291 and 292 may be block apparatuses for blocking the light incident to the first incident unit 210 or the second incident unit 220 according to the photographing mode. According to another embodiment, the first and second block members 291 and 292 may be fixed to the second support unit 244 to block the light incident from the first incident unit 210 and the second incident unit 220 from being incident to the image sensor 230. For example, the first block member 291 may be disposed between the second light path changing unit 242 and the first incident unit 210, and the second block member 292 may be disposed between the first light path changing unit 241 and the second incident unit 220, thereby blocking the light incident from the first incident unit 210 and the second incident unit 220 from being incident to the image sensor 230. In this regard, the first and second block members 291 and 292 may be formed as light block films having a wider area than that of the first and second incident units 210 and 220 in order to block light.

Figure 12A:
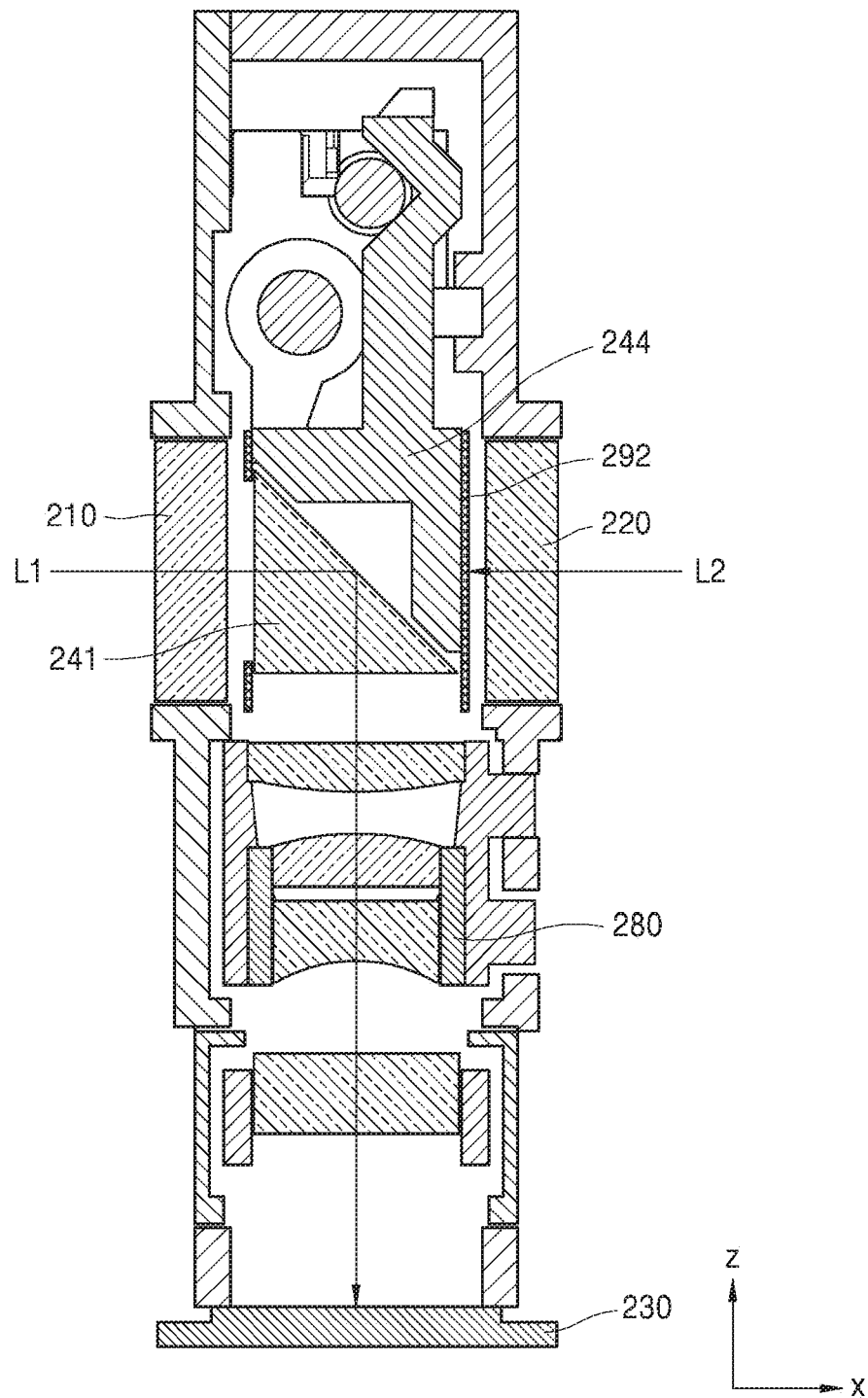
FIGS. 12A and 12B are cross-sectional views of a photographing apparatus of FIG. 9A taken along lines B-B' and C-C', respectively, according to an embodiment of the present disclosure.
Figure 12B:
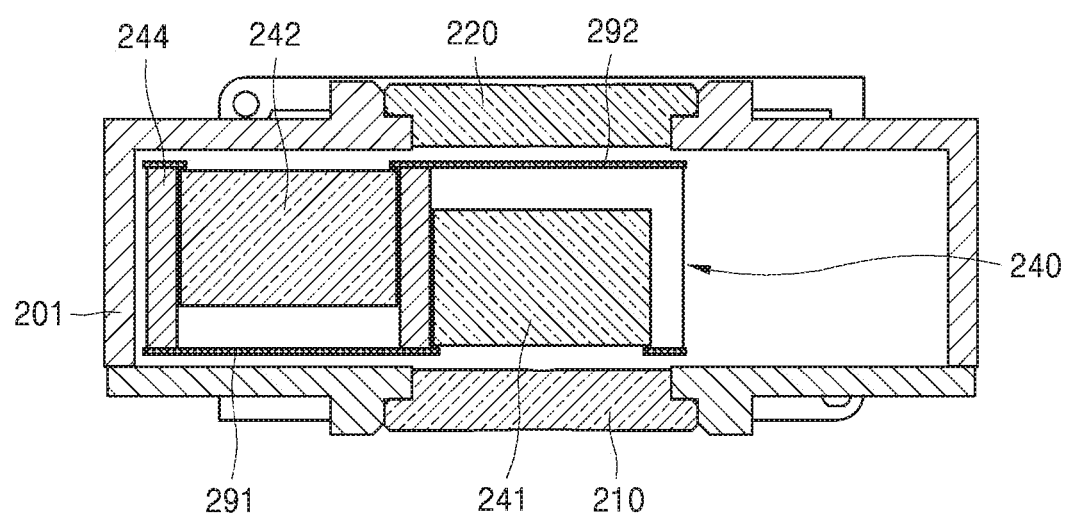

FIGS. 12A and 12B are cross-sectional views of a photographing apparatus of FIG. 9A taken along lines B-B' and C-C', respectively, according to an embodiment of the present disclosure.

Referring to FIGS. 12A and 12B, the first light L1 may be incident to the first incident unit 210 in an X direction in a first photographing mode. The first light L1 incident to the first incident unit 210 may be incident to the first light path changing unit 241 so that a path of the first light L1 may be changed in a Z axis direction. Thereafter, the first light L1 exited from the first light path changing unit 241 may be moved in the Z axis direction and then may be incident to the image sensor 230 through the VCM module 280.

In the first photographing mode, the first light path changing unit 242 may be disposed to face the first incident unit 210, and the second block member 292 may be disposed between the second incident unit 220 and the first light path changing unit 242, thereby blocking the second light L2 incident from the second incident unit 220. Accordingly, the first light L1 incident through the first incident unit 210 may be incident to the image sensor 230 without interference of the second light L2, and photographing may be performed by using the first incident unit 210 in the first photographing mode.

Figure 13A:
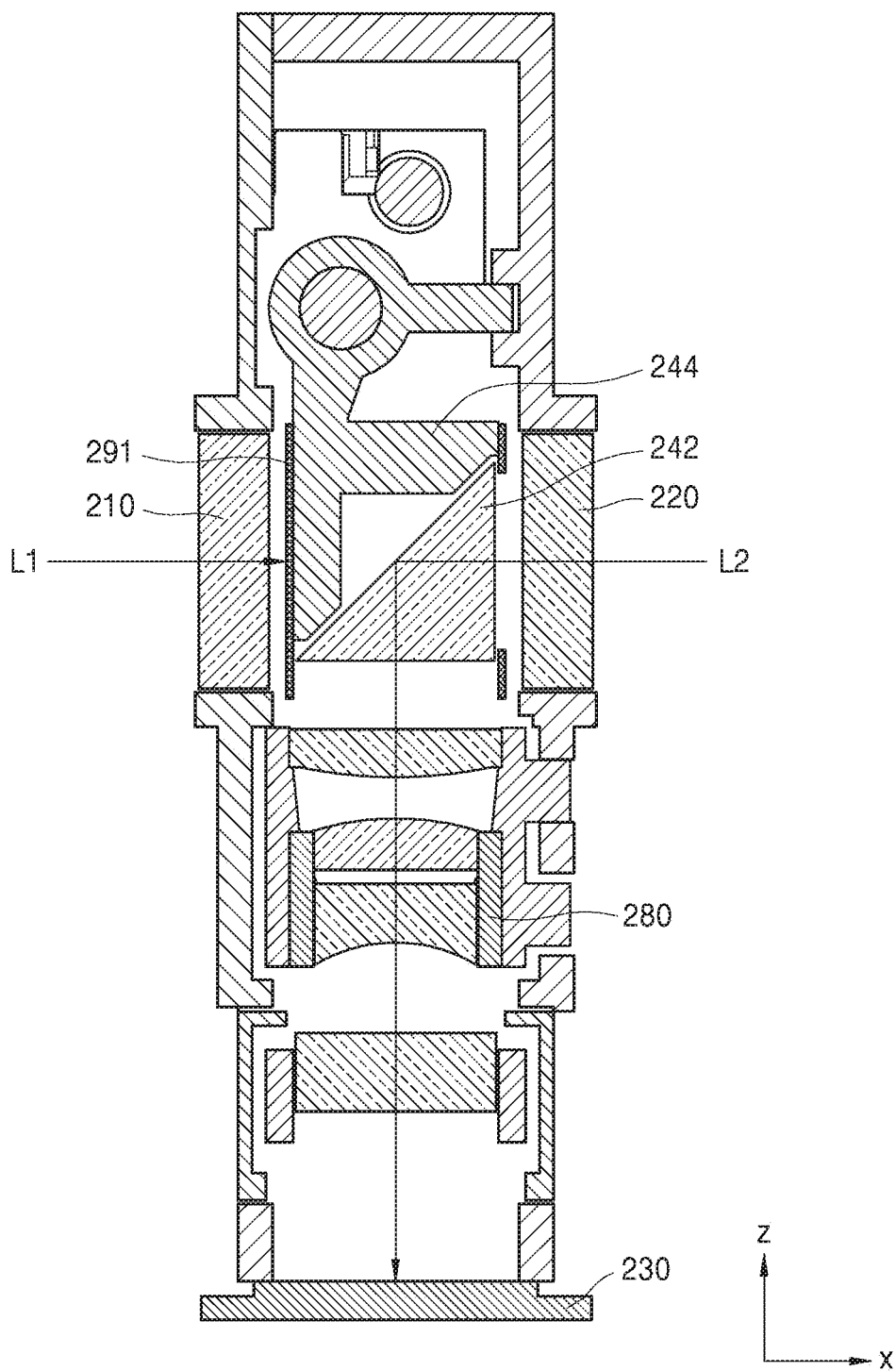
FIGS. 13A and 13B are cross-sectional views of a photographing apparatus of FIG. 9A taken along lines B-B' and C-C', respectively, according to another embodiment of the present disclosure.
Figure 13B:
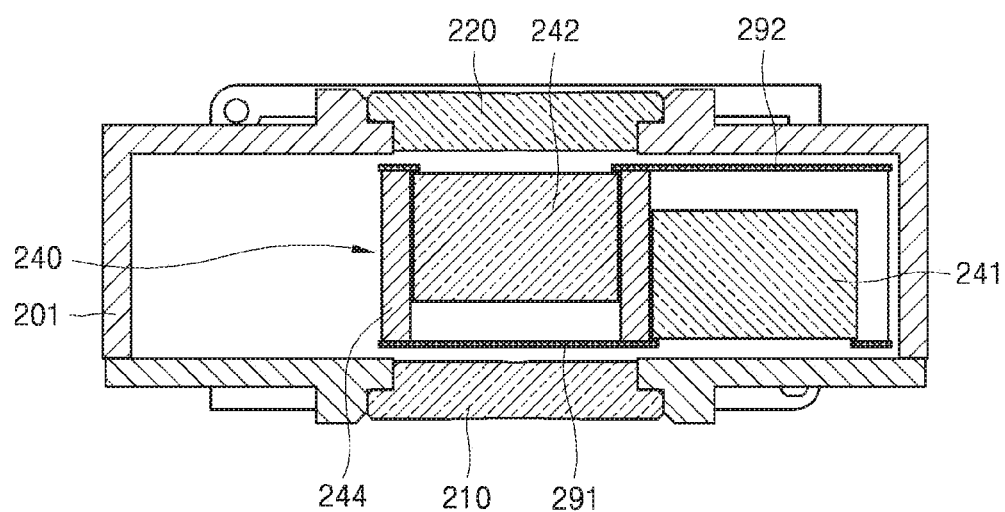

FIGS. 13A and 13B are cross-sectional views of a photographing apparatus of FIG. 9A taken along lines B-B' and C-C', respectively, according to another embodiment of the present disclosure.

Referring to FIGS. 6A, 13A, and 13B, in a case where a signal for converting a first photographing mode into a second photographing mode is input to the photographing apparatus 200, blocking may be released with respect to the second incident unit 220 such that the second light L2 may be incident to the second incident unit 220. Referring to FIG. 2, the input unit 111 may transfer the input signal with respect to conversion of a photographing mode to the control unit 270, and the sensor unit 250 may transfer a location signal of the second light path changing unit 242 to the control unit 270. The control unit 270 may analyze the received input signal and the location signal of the light path changing unit 240 and transfer a driving signal for moving the light path changing unit 240 to the driving motor 260. The driving motor 260 may generate power according to the driving signal received from the control unit 270.

Power generated by the driving motor 260 may be transferred to the second support unit 244 by the pinion gear 262a provided in one end of the driving shaft 262 of the driving motor 260 and the rack gear 244a provided in one end of the second support unit 244. The second support unit 244 may be moved by the driving motor 260 in a Y axis direction. The first light path changing unit 241 and the second light path changing unit 242 that are fixed to the second support unit 244 may also be moved in the Y axis direction. Thus, the first block member 291 may be disposed between the first incident unit 210 and the second light path changing unit 242 to block the first incident unit 210, and the second light path changing unit 242 may be disposed to face the second incident unit 220 to open the second incident unit, and thus the photographing apparatus 200 may be converted from a first photographing mode to a second photographing mode.

The second light L2 may be incident to the second incident unit 220 in an X axis direction in the second photographing mode. The second light L2 incident to the second incident unit 220 may be incident to the second light path changing unit 242 in a Z axis direction so that a path of the second light L2 may be changed. Thereafter, the second light L2 exited from the second light path changing unit 242 may be moved in the Z axis direction and then may be incident to the image sensor 230 through the VCM module 280.

In the second photographing mode, the second light path changing unit 242 may be disposed to face the second incident unit 220, and the first block member 291 may be disposed between the first incident unit 210 and the second light path changing unit 242, thereby blocking the first light L1 incident from the first incident unit 210. Accordingly, the second light L2 incident through the second incident unit 220 may be incident to the image sensor 230 without interference of the first light L1.

Figure 14:
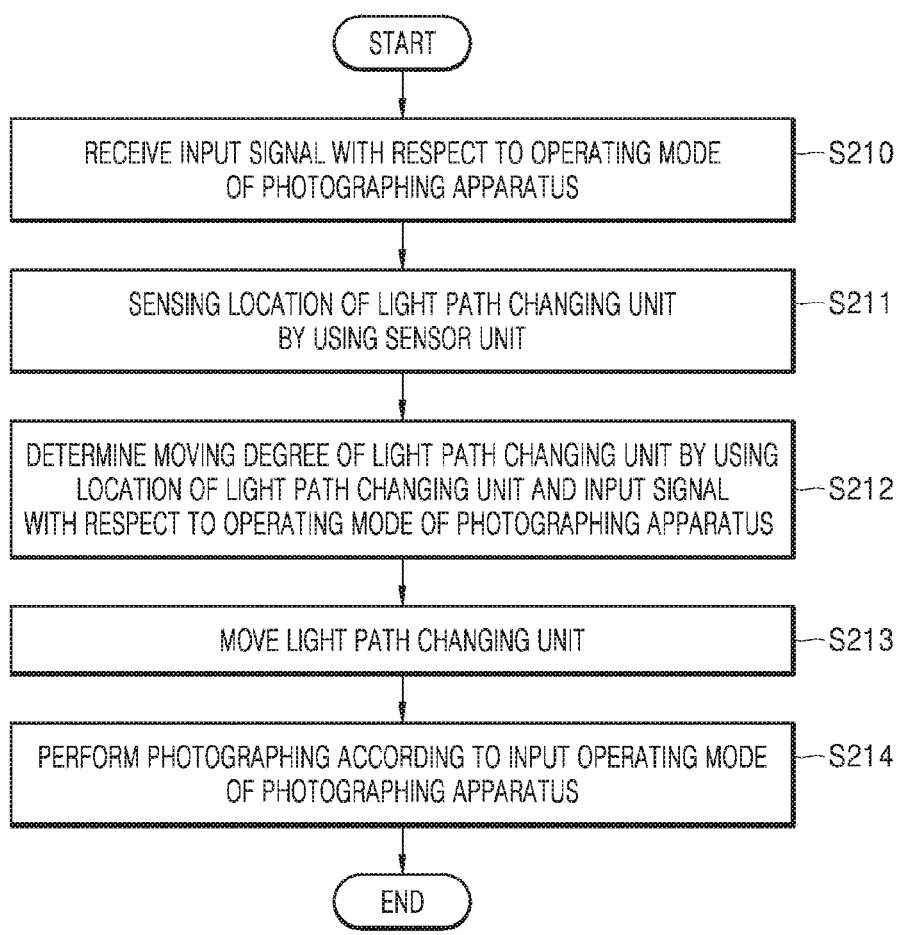
FIG. 14 is a flowchart of a method of operating a photographing apparatus according to an embodiment of the present disclosure.

FIG. 14 is a schematic flowchart of a method of operating a photographing apparatus according to an embodiment of the present disclosure.

The photographing apparatus according to an embodiment may receive an input of an operating mode through the input unit 111 at operation S210. For example, in a case where the plurality of incident units 210 and 220 are provided in the photographing apparatus, a user may input the operating mode of the photographing apparatus through the input unit 111. In a case where the plurality of incident units 210 and 220 include the first incident unit 210 and the second incident unit 220, one of the first incident unit 210 and the second incident unit 220 may be used according to the input operating mode.

The sensor unit 250 may be used to sense a current location of a light path changing unit that may be used according to the operating mode at operation S211. As described above, in a case where the operating mode of the photographing apparatus is input, one of the plurality of incident units 210 and 220 that is to be used may be determined according to an input signal. For example, in a case where the first incident unit 210 is determined to be used according to the input signal among the first incident unit 210 and the second incident unit 220, the sensor unit 250 may sense a current location of the first light path changing unit 241 for changing a path of light incident to the first incident unit 210 and may transfer the current location to the control unit 270.

The control unit 270 may receive the input signal with respect to the operating mode of the photographing apparatus from the input unit 111 and a location signal of the light path changing unit from the sensor unit 250 and may determine a moving degree of the light path changing unit at operation S212.

For example, in a case where the first incident unit 210 is determined to be used according to the input signal among the first incident unit 210 and the second incident unit 220, the control unit 270 may receive the input signal from the input unit 111 and a location signal with respect to the current location of the first light path changing unit 241 from the sensor unit 250.

The control unit 270 may calculate the location of the first light path changing unit 241 for changing a path of light incident to the first incident unit 210 by using the received input signal and location signal and may transfer a driving signal with respect to the calculation to the driving motor 260.

The driving unit 270 may move the light path changing unit according to the received driving signal at operation S213.

For example, in a case where the first incident unit 210 is determined to be used according to the input signal among the first incident unit 210 and the second incident unit 220, the control unit 270 may transfer the driving signal for moving the first light path changing unit 241 so that the driving motor 260 may move the location of the first light path changing unit 241.

The photographing apparatus may perform photographing according to the operating mode input through the input unit 111 at operation S214.

For example, in a case where the first incident unit 210 is determined to be used according to the input signal among the first incident unit 210 and the second incident unit 220, only light incident through the first incident unit 210 may output an image incident to the image sensor 230.

According to a photographing apparatus and a wireless communication terminal according to the various embodiments, only one image sensor may be provided in the photographing apparatus with respect to a plurality of incident units, thereby reducing an entire size of the photographing apparatus, and an area of the image sensor used in the plurality of incident units may be relatively large, thereby increasing quality of an output image.

In the photographing apparatus, the first light or the second light that is incident through the first incident unit or the second incident unit may be selectively incident to the image sensor according to a photographing mode of the photographing apparatus.

The first incident unit and the second incident unit may be positioned according to a predetermined gap in a light axis direction of the first light and the second light that are incident to the image sensor.

The photographing apparatus may further include a driving motor for moving the second light path changing unit, and the second incident unit and the second light path changing unit may be arranged to face each other by moving the second light path changing unit according to a photographing mode of the photographing apparatus.

The photographing apparatus may further include a sensor unit for sensing a location of the second light path changing unit and a control unit for generating a driving signal transferred to the driving motor according to the location of the second light path changing unit sensed by the sensor unit.

The photographing apparatus may further include a first blocking member, when the second incident unit is used according to the photographing mode of the photographing apparatus, configured to block the first light incident to the first incident unit from being incident to the image sensor and a second blocking member, when the first incident unit is used according to the photographing mode of the photographing apparatus, configured to block the second light incident to the second incident unit from being incident to the image sensor.

The first blocking member may be fixed to the second light path changing unit, and, when the second incident unit is used, may be positioned between the first incident unit and the second light path changing unit and the second blocking member may be fixed to the second light path changing unit, and, when the first incident unit is used, may be positioned between the second incident unit and the image sensor.

The second blocking member may be a shutter film including one opening unit, when the second incident unit is used, the opening unit may be arranged to face the second incident unit so that blocking by the second blocking member with respect to the second incident unit is released, and, when the first incident unit is used, the opening unit may not be arranged to face the second incident unit so that the second blocking member blocks the second incident unit.

The shutter film may be bendable.

The first incident unit and the second incident unit may face each other.

The photographing apparatus may further include a driving motor configured to move the first light path changing unit and the second light path changing unit, the first incident unit and the first light path changing unit may be arranged to face each other or the second incident unit and the second light path changing unit may be arranged to face each other by moving the first light path changing unit and the second light path changing unit according to the photographing mode of the photographing apparatus.

The photographing apparatus may further include a sensor unit configured to sense locations of the first light path changing unit and the second light path changing unit and a control unit configured to generate a driving signal that is to be transferred to the driving motor according to a signal indicating the locations of the first light path changing unit and the second light path changing unit sensed by the sensor unit.

The photographing apparatus may further include a first blocking member, when the second incident unit is used according to the photographing mode of the photographing apparatus, configured to block the first light incident to the first incident unit from being incident to the image sensor and a second blocking member, when the first incident unit is used according to the photographing mode of the photographing apparatus, configured to block the second light incident to the second incident unit from being incident to the image sensor.

The first blocking member may be fixed to the second light path changing unit, and, when the second incident unit is used, may be positioned between the first incident unit and the second light path changing unit and the second blocking member may be fixed to the first light path changing unit, and, when the first incident unit is used, may be positioned between the second incident unit and the first light path changing unit.

The first light path changing unit and the second light path changing unit may include prisms or mirrors.

The photographing apparatus may further include a voice coil motor (VCM) module between the image sensor and the first incident unit and the second incident unit.

In accordance with another aspect of the present disclosure, a wireless communication terminal is provided. The wireless communication terminal includes the photographing apparatus.

One of a first incident unit and a second incident unit may be positioned in a front surface of the wireless communication terminal and the other one may be positioned in a rear surface of the wireless communication terminal.

In the method of operating a photographing apparatus method, the method may further detect a location of the light path changing unit by using a sensor unit, the determining of the moving degree of the light path changing unit includes determining the moving degree of the light path changing unit according to the operating mode of the photographing apparatus and the location of the light path changing unit sensed by the sensor unit.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A photographing apparatus comprising:
a first incident unit to which a first light is incident;
a second incident unit to which a second light different from the first light is incident;
an image sensor to which the first light and the second light are incident;
a first light path changing unit configured to change a path of the first light from the first incident unit to the image sensor;
a second light path changing unit configured to change a path of the second light from the second incident unit to the image sensor; and
a driving motor configured to move the first light path changing unit and the second light path changing unit,
wherein the first incident unit and the first light path changing unit are arranged to face each other or the second incident unit and the second light path changing unit are arranged to face each other by moving the first light path changing unit and the second light path changing unit according to the photographing mode of the photographing apparatus.

2. The photographing apparatus of claim 1, wherein the first light or the second light that is incident through the first incident unit or the second incident unit is selectively incident to the image sensor according to a photographing mode of the photographing apparatus.

3. The photographing apparatus of claim 1, further comprising:
a blocking member,
wherein the blocking member includes a shutter film that is bendable.

4. The photographing apparatus of claim 2, wherein the first incident unit and the second incident unit face each other.

5. The photographing apparatus of claim 1, further comprising:
a sensor unit configured to detect locations of the first light path changing unit and the second light path changing unit; and
a control unit configured to generate a driving signal that is to be transferred to the driving motor according to a signal indicating the locations of the first light path changing unit and the second light path changing unit sensed by the sensor unit.

6. The photographing apparatus of claim 1, further comprising:
a first blocking member configured to block the first light incident to the first incident unit from being incident to the image sensor when the second incident unit is used according to the photographing mode of the photographing apparatus; and
a second blocking member configured to block the second light incident to the second incident unit from being incident to the image sensor when the first incident unit is used according to the photographing mode of the photographing apparatus.

7. The photographing apparatus of claim 6,
wherein the first blocking member is fixed to the second light path changing unit, and, when the second incident unit is used, is positioned between the first incident unit and the second light path changing unit,
wherein the second blocking member is fixed to the first light path changing unit, and
wherein, when the first incident unit is used, the second blocking member is positioned between the second incident unit and the first light path changing unit.

8. The photographing apparatus of claim 1, wherein the first light path changing unit and the second light path changing unit comprise prisms or mirrors.

9. The photographing apparatus of claim 1, further comprising:

a voice coil motor (VCM) module between the image sensor and the first incident unit and the second incident unit.

10. A wireless communication terminal comprising the photographing apparatus of claim 1.

11. The wireless communication terminal of claim 10, wherein one of the first incident unit and the second incident unit is positioned in a front surface of the wireless communication terminal and the other one is positioned in a rear surface of the wireless communication terminal.

12. A method of operating a photographing apparatus, the method comprising:

receiving an input signal with respect to an operating mode of the photographing apparatus;

determining a moving degree of a first light path changing unit and a second light path changing unit according to the operating mode of the photographing apparatus;

moving the first light path changing unit and the second light path changing unit; and performing photographing according to the operating mode of the photographing apparatus by using the input signal.

13. The method of claim 12, further comprising:

detecting a location of the first light path changing unit and the second light path changing unit by using a sensor unit, wherein the determining of the moving degree of the first light path changing unit and the second light path changing unit comprises:

determining the moving degree of the first light path changing unit and the second light path changing unit according to the operating mode of the photographing apparatus and the location of the first light path changing unit and the second light path changing unit detected by the sensor unit.

* * * * *